United States Patent
Arora et al.

(10) Patent No.: US 10,754,967 B1
(45) Date of Patent: Aug. 25, 2020

(54) SECURE INTERRUPT HANDLING BETWEEN SECURITY ZONES

(71) Applicant: MARVELL INTERNATIONAL LTD., Hamilton (BM)

(72) Inventors: Gaurav Arora, Cupertino, CA (US); Yongsen Chen, Shanghai (CN); Adil Jagmag, Hollis, NH (US); Pontus Lidman, Saratoga, CA (US); Haobo Yu, Irvine, CA (US); Yongbing Chen, Milpitas, CA (US); Ailing Du, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 160 days.

(21) Appl. No.: 14/969,316

(22) Filed: Dec. 15, 2015

Related U.S. Application Data

(60) Provisional application No. 62/091,848, filed on Dec. 15, 2014.

(51) Int. Cl.
  *G06F 21/62* (2013.01)
  *G06F 21/60* (2013.01)

(52) U.S. Cl.
  CPC ........ *G06F 21/6218* (2013.01); *G06F 21/606* (2013.01)

(58) Field of Classification Search
  CPC .................................................... G06F 21/606
  See application file for complete search history.

(56) References Cited

U.S. PATENT DOCUMENTS

| | | | | |
|---|---|---|---|---|
| 6,378,023 | B1* | 4/2002 | Christie | G06F 12/0875 710/260 |
| 8,549,300 | B1* | 10/2013 | Kumar | H04L 9/3247 713/153 |
| 9,191,388 | B1* | 11/2015 | Paczkowski | H04L 67/327 |
| 9,473,480 | B2* | 10/2016 | Mason | H04L 63/10 |
| 9,842,065 | B2* | 12/2017 | Banginwar | G06F 12/145 |
| 2002/0147916 | A1* | 10/2002 | Strongin | G06F 12/1483 713/193 |
| 2003/0018842 | A1* | 1/2003 | Harbin | G06F 13/24 710/260 |

(Continued)

OTHER PUBLICATIONS

NPL Search (Google Scholar) (Year: 2020).*

*Primary Examiner* — Mahfuzur Rahman
*Assistant Examiner* — Richard W Cruz-Franqui

(57) ABSTRACT

Systems, methods, and other embodiments associated with handling secure interrupts between security zones are described. According to one embodiment, an apparatus includes a memory divided between a secure zone and a non-secure zone and storing a plurality of applications. The secure zone provides exclusive access to secure assets of the apparatus. A processor with an interface module configured to, in response to receiving an interrupt request from a requesting application that executes on the processor in the non-secure zone, tunnel the interrupt request into the secure zone of the processor. The non-secure zone and the secure zone are configured as operating environments of the processor with separate security controls. The processor includes a monitor module configured to issue the secure interrupt to a trusted application that is one of the plurality of applications in the secure zone, wherein the trusted application is registered to handle the secure interrupt.

20 Claims, 5 Drawing Sheets

(56) References Cited

U.S. PATENT DOCUMENTS

| | | | |
|---|---|---|---|
| 2005/0160210 A1* | 7/2005 | Watt | G06F 9/4812 710/269 |
| 2006/0123172 A1* | 6/2006 | Herrell | G06F 13/24 710/269 |
| 2007/0226795 A1* | 9/2007 | Conti | G06F 21/554 726/22 |
| 2007/0294496 A1* | 12/2007 | Goss | G06F 12/1483 711/163 |
| 2008/0162770 A1* | 7/2008 | Titiano | G06F 1/3203 710/309 |
| 2009/0049220 A1* | 2/2009 | Conti | G06F 13/24 710/267 |
| 2009/0106832 A1* | 4/2009 | Haga | G06F 9/468 726/16 |
| 2010/0242097 A1* | 9/2010 | Hotes | H04L 9/3213 726/4 |
| 2010/0319001 A1* | 12/2010 | Jones | G06F 9/4411 718/108 |
| 2010/0325445 A1* | 12/2010 | McKeen | G06F 21/53 713/189 |
| 2012/0204030 A1* | 8/2012 | Nossik | H04L 9/0897 713/168 |
| 2012/0239904 A1* | 9/2012 | Ekanadham | G06F 9/3851 711/207 |
| 2013/0345530 A1* | 12/2013 | McRoberts | H04L 63/08 600/323 |
| 2014/0006347 A1* | 1/2014 | Qureshi | G06F 21/53 707/621 |
| 2014/0032691 A1* | 1/2014 | Barton | G06F 21/604 709/206 |
| 2014/0032759 A1* | 1/2014 | Barton | H04L 63/20 709/225 |
| 2014/0123230 A1* | 5/2014 | Farina | H04L 63/0272 726/4 |
| 2014/0208123 A1* | 7/2014 | Roth | G06F 21/72 713/189 |
| 2014/0258716 A1* | 9/2014 | MacMillan | G06F 21/602 713/164 |
| 2015/0149565 A1* | 5/2015 | Ahmed | H04L 51/04 709/206 |
| 2015/0235055 A1* | 8/2015 | An | G06F 21/32 713/186 |
| 2016/0044035 A1* | 2/2016 | Huang | H04L 41/0806 726/4 |
| 2016/0149858 A1* | 5/2016 | Asaithambi | H04L 63/029 726/12 |
| 2016/0364341 A1* | 12/2016 | Banginwar | G06F 9/45545 |
| 2016/0366144 A1* | 12/2016 | Ashwood-Smith | G06F 21/6218 |

* cited by examiner

US 10,754,967 B1

SECURE INTERRUPT HANDLING BETWEEN SECURITY ZONES

CROSS REFERENCE TO RELATED APPLICATIONS

This patent disclosure claims the benefit of U.S. Provisional Application Ser. No. 62/091,848 filed on Dec. 15, 2014, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Maintaining security in a computing environment is a difficult task. For example, malicious processes may attempt to alter programs, intercept information or otherwise maliciously interfere with operation of a device with the intent of compromising the integrity, authenticity, and/or confidentiality of the data and programs. When processes execute in an insecure environment those processes are generally susceptible to interference by malicious processes that may intercept/alter hardware level commands.

Furthermore, devices may use various authentication routines to attempt to secure the device and data, but these routines are still susceptible to many attacks. Additionally, special purpose security hardware may be implemented separately to perform sensitive tasks and provide additional security. However, implementing a separate processor to handle sensitive tasks is an expensive compromise. Thus, maintaining security in a computing device can be complex.

SUMMARY

In general, in one aspect this specification discloses a processor. The processor includes an interface module implemented in a non-transitory computer-storage medium including instructions that when executed cause the processor to, in response to receiving an interrupt request from a requesting application executing in a non-secure zone, tunnel the interrupt request into a secure zone of the processor. The non-secure zone and the secure zone are operating environments of the processor with separate security controls that regulate access to secure assets exclusive to the secure zone. The processor includes a monitor module configured to issue, in response to receiving the interrupt request, a secure interrupt to a trusted application that is registered to handle the secure interrupt. The trusted application is authorized to execute when the processor is operating in the secure zone. The monitor module is configured to service the secure interrupt by causing the trusted application to execute on the processor and interact with one of the secure assets on behalf of the requesting application.

In general, in another aspect, this specification discloses a method for controlling a processor to handle secure interrupts. The method includes tunneling an interrupt request into a secure zone of the processor from a requesting application executing on the processor in a non-secure zone. The non-secure zone and the secure zone are operating environments of the processor with separate security controls that regulate access to secure assets exclusive to the secure zone. The method includes issuing, by a monitor module executing within the secure zone in response to receiving the interrupt request, a secure interrupt to a trusted application that is registered to handle the secure interrupt. The trusted application is authorized to execute when the processor is operating in the secure zone. The method includes servicing the secure interrupt by executing the trusted application on the processor to interact with one of the secure assets on behalf of the requesting application.

In general, in another aspect, this specification discloses an apparatus. The apparatus includes a memory divided between a secure zone and a non-secure zone and storing a plurality of applications. The secure zone provides exclusive access to secure assets of the apparatus. The apparatus includes a processor comprising an interface module configured to, in response to receiving an interrupt request from a requesting application that executes on the processor in the non-secure zone, tunnel the interrupt request into the secure zone of the processor. The non-secure zone and the secure zone are configured as operating environments of the processor with separate security controls. The processor includes a monitor module configured to issue, in response to receiving the interrupt request, the secure interrupt to a trusted application that is one of the plurality of applications in the secure zone. The trusted application is registered to handle the secure interrupt. The trusted application is authorized to execute when the processor is operating in the secure zone.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Figure 1:
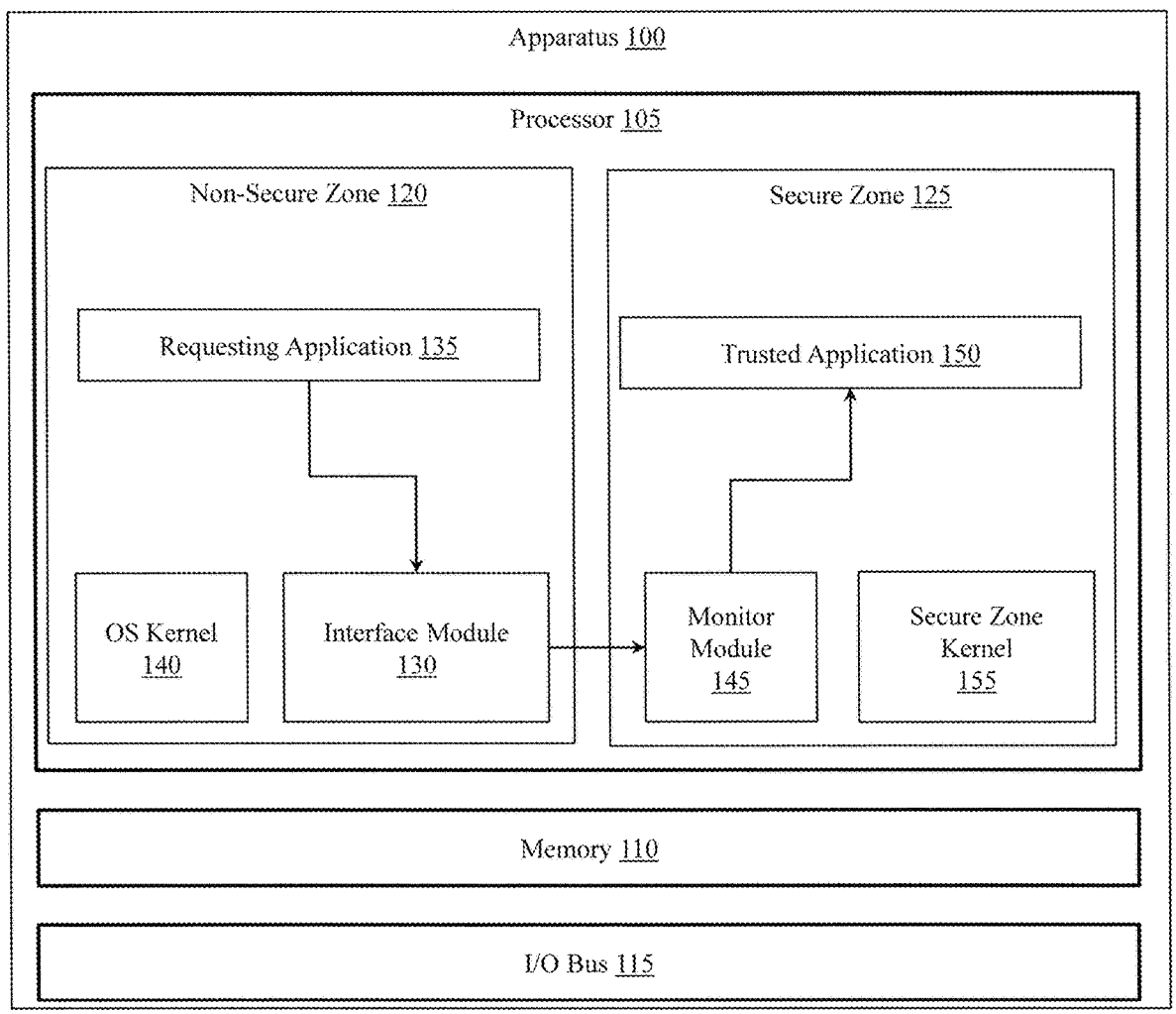
FIG. 1 illustrates one embodiment of an apparatus associated with handling secure interrupts between security zones.

Described herein are examples of systems, methods, and other embodiments associated with secure interrupt handling between security zones in a processor. In one embodiment, the processor both issues and services secure interrupts within a secure zone by tunneling interrupt requests originating in a non-secure zone into the secure zone. In this way, the processor isolates access to secure routines and secure resources to the secure zone to protect the routines and resources from malicious interference.

For example, the processor handles requests for secure interrupts from the non-secure zone (e.g., real-world execution environment (REE)) by passing the requests to the secure zone (e.g., trusted execution environment (TEE)). That is, to provide access to the secure interrupts for applications operating in the non-secure zone, the processor tunnels interrupt requests into the secure zone without the requests being handled by additional tasks in the non-secure zone other than an originating application. Thus, secure services/routines and secure resources that are linked to the secure interrupts are secured since access to the services and resources occurs when the processor is operating in the secure zone.

As described in this disclosure, the processor operates according to separate security zones. The security zones are, for example, different operating environments for the processor in which different security controls dictate how the processor operates and handles requests for secure assets. As mentioned, a first security zone is a non-secure zone (e.g., real-world execution environment (REE)). When the processor is executing in the non-secure zone, an operating system kernel and applications are, for example, restricted from interacting with (e.g., directly controlling/modifying) secure assets that are exclusive to the secure zone. The processor may restrict the OS kernel and the applications executing in the non-secure zone by preventing the applications from addressing secure portions of memory, accessing secure input/output channels or other secure I/O resources, and from interacting with secure routines (e.g., secure timers, real-time clock, etc.).

By contrast, a second security zone is a secure zone (e.g., trusted execution environment (TEE)). When the processor is operating in the secure zone, routines executing on the processor can access the secure assets. However, the routines that execute in the secure zone are separate from the OS kernel and the applications that operate in the non-secure zone. Thus, the OS kernel and the applications in the non-secure zone cannot directly access the secure assets because they are not executing in the secure zone. These elements from the non-secure zone cannot access the secure assets because the non-secure zone and the secure zone are separate operating instances of the processor that do not generally execute simultaneously and are not otherwise linked or aware of each other and thus do not generally communicate or exchange information.

In general, the security zones may be thought of as separate contexts or virtual machines that each operate on the processor independently from one another. By maintaining the security zones independently, the processor isolates the secure assets (i.e., secure routines and resources) from un-trusted applications executing within the non-secure zone and thus secures the assets from malicious attack.

To achieve this separation, the processor switches contexts (also referred to as switching "worlds") to swap between operating in the secure zone and the non-secure zone when access to the secure assets is requested. In one embodiment, the processor extends access to the secure interrupts into the non-secure zone by permitting interrupt requests from applications executing in the non-secure zone to be tunneled into the secure zone. Handling the interrupt requests in this manner causes associated secure interrupts to be issued and serviced within the secure zone. In this way, applications operating in the non-secure zone can indirectly access the secure assets while maintaining the secure assets apart from the non-secure zone.

With reference to FIG. 1, one embodiment of an apparatus 100 is shown that is associated with issuing and servicing secure interrupts in a secure zone of a processor 105. The apparatus 100 includes the processor 105, a memory 110, and input/output bus 115. Of course, the apparatus 100 may include additional components that have been omitted from FIG. 1 for purposes of brevity. Furthermore, in general, the processor 105 is a hardware processor such as an Acorn Reduced Instruction Set Computing Machine (ARM) processor, or similar device, that electronically executes instructions to modify and otherwise manipulate electronic data and causes the apparatus 100 to perform various electronic functions (e.g., generate a graphical user interface, display the GUI on a monitor, electronically transmit data over a medium, and so on).

Additionally, in one embodiment, the memory 110 is an embedded memory such as a Random Access Memory (RAM) or Static-RAM (SRAM) that stores electronic data structures, instructions and other information used/executed by the processor 105. The I/O bus 115 are an interface between the processor 105 and one or more devices such as a display, a digital versatile disc (DVD) player, a microphone, a speaker, a communications device (e.g., transceiver), a universal serial bus (USB) and so on.

Returning to the processor 105, the processor 105 includes two separate zones, a non-secure zone 120 and a secure zone 125. The zones 120 and 125 are separate operating environments of the processor 105. The secure zone 125 is, for example, a trusted execution environment (TEE) or TrustZone while the non-secure zone 120 is, for example, a real-world execution environment (REE). The separate security zones implement separate security controls to regulate access to different assets (e.g., the memory 110, the I/O bus 115, etc.) in the apparatus 100.

Furthermore, the separate zones 120 and 125 include different functional modules. In one embodiment, the non-secure zone 120 includes an interface module 130, at least one requesting application 135, and an operating system (OS) kernel 140. The secure zone 125 includes a monitor module 145, at least one trusted application 150, and a secure zone kernel 155. In one embodiment, the modules, applications and kernels are executable programs comprised of instructions and other electronic data structures that execute on the processor 105. In general, the instructions are stored on a non-transitory computer-readable storage medium such as the memory 110 and are executed by the processor 105 to cause the apparatus 100 to perform various actions and to control the processor 105 to operate and function as disclosed.

Furthermore, the OS kernel 140 is, for example, an operating system that executes on the processor 105, such as, Linux or another suitable operating system. The requesting application 135 is, for example, a user level application or utility that executes within a user level of the non-secure zone 120 to provide computerized functionality to a user of the apparatus 100. Additionally, the interface module 130 is a kernel level module that interacts with the requesting application 135 or other applications operating in the non-secure zone. Thus, the interface module 130 is generally a service provided on the processor 105 for use by user-level applications and so on. The interface module 130 will be discussed in greater detail subsequently, however, in general, the interface module 130 handles requests for secure interrupts generated in the non-secure zone 120 by tunneling the requests into the secure zone 125.

The trusted application 150 and the secure zone kernel 155 are similar to the requesting application 135 and the OS kernel 140 with the added caveat that the trusted application 150 and the secure zone kernel 155 operate in the secure zone 125 and include additional built in secure functionality and attributes. For example, the trusted application 150 and secure zone kernel 155 are electronically signed and include associated message authentication codes (MACs) and interfaces for ensuring integrity, authenticity and security.

In regards to the non-secure zone 120 versus the secure zone 125, the zones 120 and 125 do not operate simultaneously. That is, the processor 105 is configured to switch between the two zones in order to maintain security. For example, in one embodiment, the zones are separate processes, and the processor 105 switches between the processes by performing context switches (also referred to as world switches). In one embodiment, the processor 105 switches between the zones by storing a present state of the processor 105 and loading a separate state associated with the other zone (i.e., a state of the secure zone as previously saved). Thus, the processor 105 swaps one state for another by, for example, swapping register values and active memory spaces. Accordingly, the processor 105 switches between operating within separate environments associated with the separate zones in order to perform different functions and execute different applications associated with each zone.

Operating in the separate environments permits the processor 105 to implement separate policies/controls for each of the zones. As implemented in this disclosure, the separate policies/controls are realized through how different assets of the apparatus 100 may be accessed or restricted. For example, the processor 105 and, thus, active routines executing on the processor 105, are restricted from accessing secure assets when the processor is operating in the non-secure zone 120. However, the processor 105 can access the secure assets when operating in the secure zone 125.

Accordingly, the interface module 130 is configured to tunnel a request for the secure assets to the secure zone 125 from the requesting application 135 of the non-secure zone. In general, the requests are interrupt requests. These requests are referred to as interrupt requests because they generally interrupt execution of a presently executing thread or process in order to cause the processor 105 to switch to the secure zone 125 and access a resource or routine associated with the interrupt request.

Figure 2:
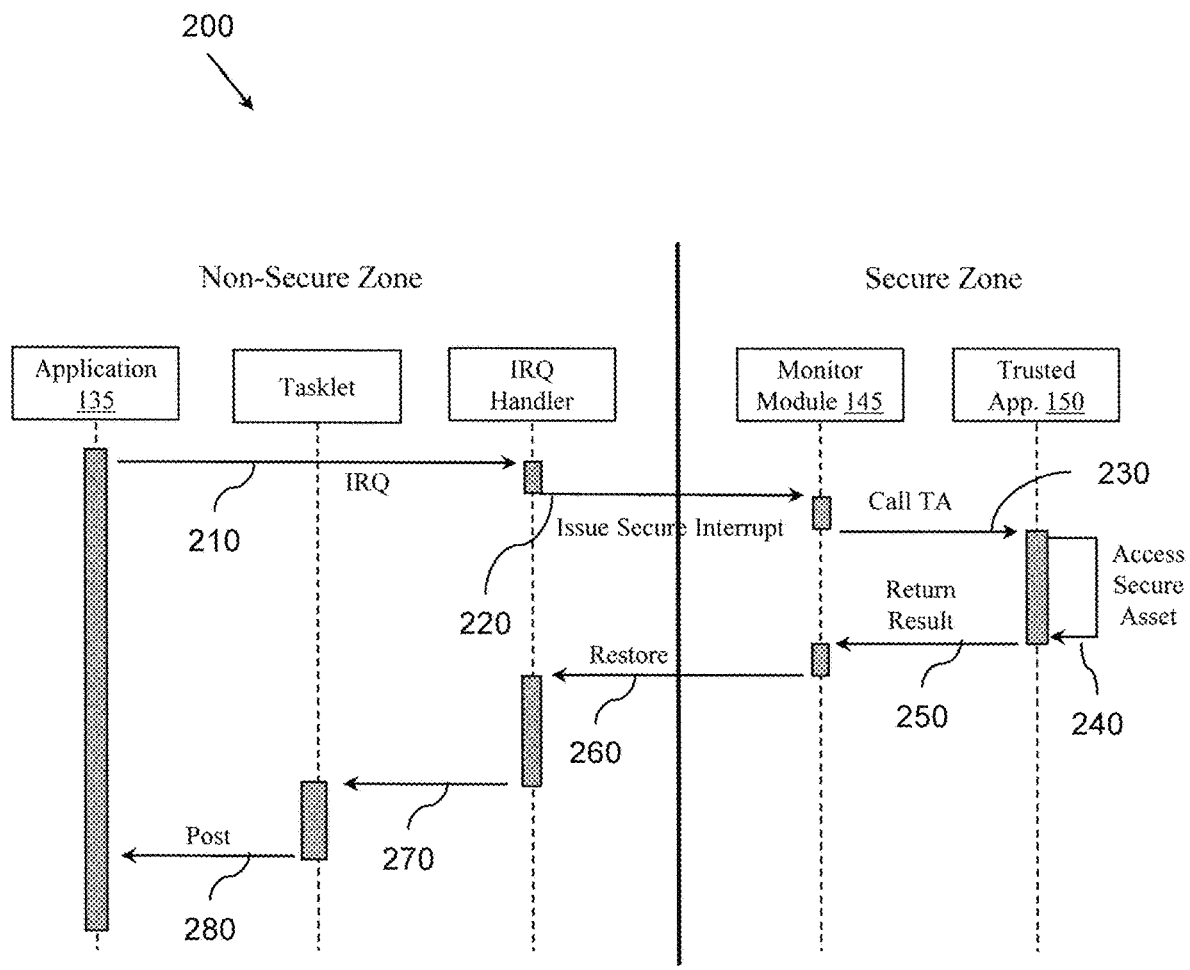
FIG. 2 illustrates one example of a flow diagram associated with handling interrupts between security zones.

To better understand how the interface module 130 tunnels the interrupt request between the security zones, first consider FIG. 2. FIG. 2. Illustrates one example of an alternative flow 200 for an interrupt request and associated secure interrupt when the secure interrupt is not issued from the secure zone, but is instead issued from the non-secure zone. FIG. 2 is discussed first to provide a point of contrast in relation to the preferred flow of FIG. 3 as implemented by the processor 105. Solid vertical rectangles, in FIG. 2, represent time during which an associated routine is executing or in standby.

As shown in FIG. 2, the requesting application 135 initially issues an interrupt request (IRQ) 210 to an IRQ handler of the processor 105 that is within the non-secure zone 120. The IRQ handler generally issues and services interrupts that are not secure for the non-secure zone 120. In the example shown in FIG. 2, the IRQ handler also issues secure interrupts. Thus, the IRQ handler issues a secure interrupt 220 from within the non-secure zone 120 on behalf of the requesting application 135. Issuing the secure interrupt from the non-secure zone 120 exposes aspects of the secure interrupt and an associated secure asset. For example, by issuing the secure interrupt from the non-secure zone 120 the IRQ handler exposes process IDs, memory locations, access configurations, and so on about the secure asset. Exposing this information and the secure interrupt itself risks interference with the secure asset by a malicious process since the secure interrupt is exposed within the non-secure zone 120 where unauthenticated processes may be executing.

The alternative flow 200 of FIG. 2 proceeds with the processor 105 switching zones in response to issuing the secure interrupt. The processor 105 switches to the secure zone 125 where the monitor module 145 receives the issued secure interrupt. The monitor module 145 services the secure interrupt at 230 by calling a registered trusted application 150 for the secure interrupt. Subsequently, the trusted application 150 accesses the secure asset at 240, completes servicing of the secure interrupt by returning a result at 250 to the monitor module 145. The monitor module 145 then hands off the result and causes the non-secure zone 120 to be restored at 260. The IRQ handler passes the result at 270 to a tasklet which then posts the result to the requesting application 135 at 280.

Figure 3:
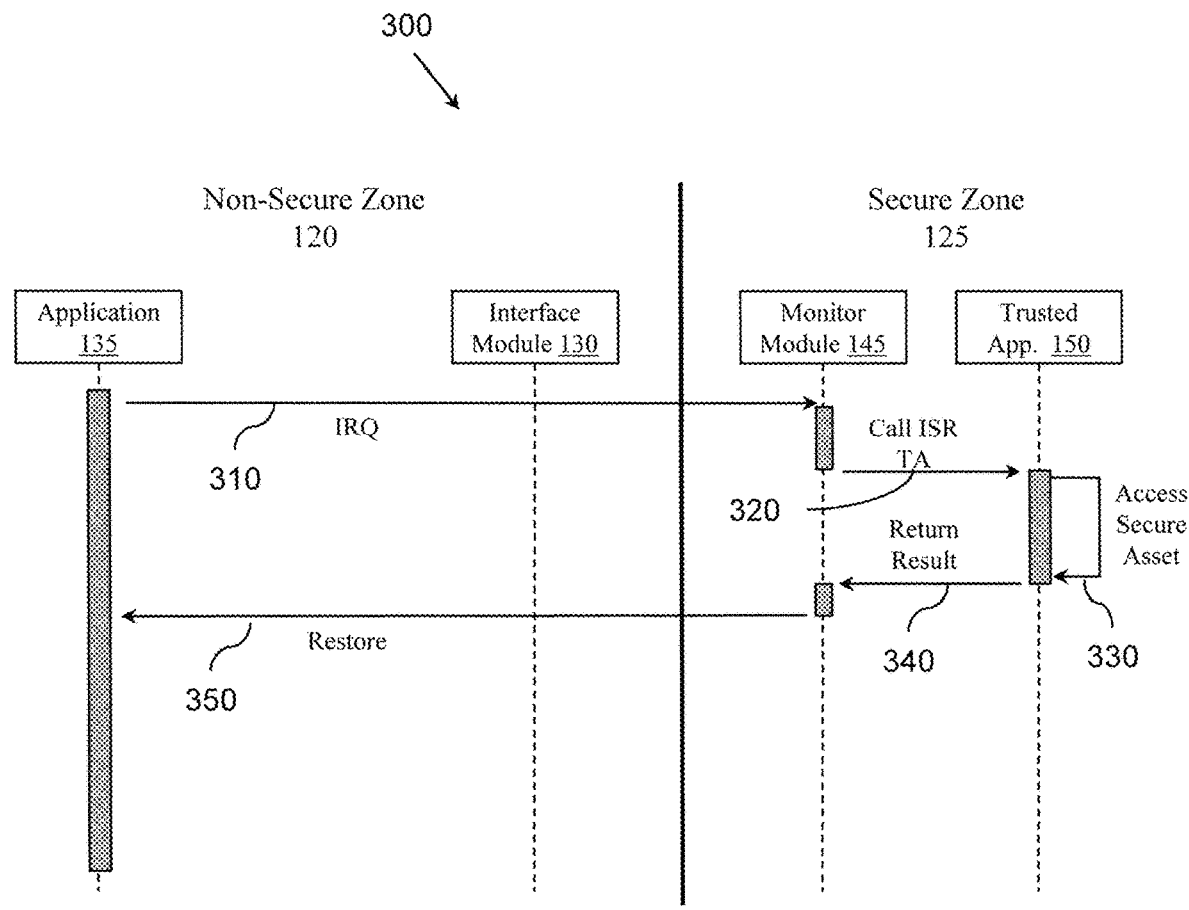
FIG. 3 illustrates one example of a flow diagram associated with handling secure interrupts in a secure zone of a processor.
Figure 4:
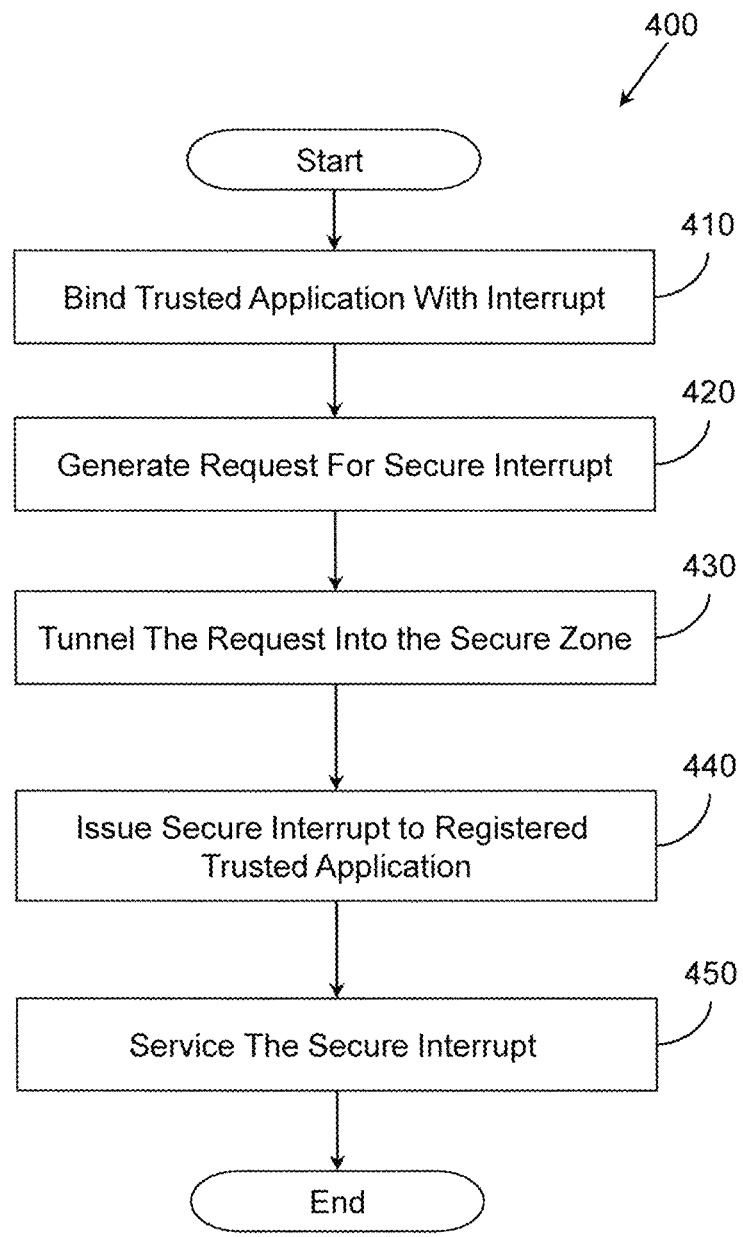
FIG. 4 illustrates one embodiment of a method associated with handling secure interrupts in a processor between security zones.

Now consider FIG. 3 and the preferred flow 300. The flow 300 will be discussed in relation to method 400 of FIG. 4. Additionally, method 400 will be discussed from the perspective of the apparatus 100 of FIG. 1.

At 410, a trusted application is bound to a secure interrupt. In one embodiment, the monitor module 145 binds a trusted application to a secure interrupt in response to the trusted application being installed. Binding the trusted application to the secure interrupt causes the trusted application to be executed whenever the secure interrupt is invoked.

To bind the trusted application with the secure interrupt, the monitor module 145 generates an entry in a lookup table that identifies the trusted application (e.g., trusted application 150) as being able to service the secure interrupt. Accordingly, to bind the trusted application 150 with the secure interrupt, the monitor module 145, in one embodiment, parses a request by the trusted application 150 to identify information associated with the trusted application 150, determines an associated secure interrupt, generates an electronic data structure with information about the trusted application 150, and stores the electronic data structure in the lookup table. In this way, the trusted application 150 is registered with the monitor module 145 and bound to the secure interrupt.

Furthermore, the lookup table itself is, for example, a registry that includes a listing of different trusted applications that are capable of servicing different secure interrupt requests of the processor 105. In one embodiment, the lookup table is an electronic data structure that is stored in, for example, the memory 110 and includes a listing of the secure interrupts along with correlating trusted applications. In this way, the processor 105 uses the monitor module 145 and the lookup table to decouple servicing of the secure interrupts from the monitor module 145. Instead, the monitor module 145 implements the lookup table so that separate individually installed trusted applications can be used to service the interrupt requests. Accordingly, the processor 105 operates more efficiently by being able to selectively install and use different trusted applications to handle the secure interrupts.

Returning to method 400, at 420, the requesting application 135 generates an interrupt request. In one embodiment, the requesting application 135 generates the interrupt request to access a secure asset. As explained previously, secure assets are resources and routines of the apparatus 100 that are sensitive and thus secured from direct access by applications in the non-secure zone 120. Accordingly, the requesting application 135 cannot directly address certain memory locations or I/O bus and cannot directly call certain routines (e.g., secure timer). Instead, the requesting application 135 uses the interrupt requests to indirectly cause a secure interrupt to be issued and serviced that accesses the secure asset on behalf of the requesting application 135.

Furthermore, in one embodiment, generating the interrupt request includes monitoring for an event (e.g., an input, executing a specific piece of code, request for access to a resource, etc.) on the processor 105, identifying an occurrence of the event, calling a routine, generating an electronic data structure that includes information specifying a secure asset, and calling/invoking the interface module 130 at 310 by passing the electronic data structure to the interface module 130. Consequently, using the interrupt request, the requesting application 135 can initiate access to the secure asset through the interface module 130.

At 430, the interrupt request is tunneled from the non-secure zone 120 into the secure zone 125. In one embodiment, the interface module 130 receives the interrupt request and, in response to the request, invokes an application program interface (API) that bypasses the operating system kernel 140 of the non-secure zone 120 and provides the interrupt request directly to the monitor module 145 in the secure zone 125 of the processor 105.

The interface module 130 uses, for example, a secure monitor call (SMC) to tunnel the interrupt request at 310 by calling the monitor module 145. While the interface module 130 is discussed as a separate entity, in one embodiment, the interface module 130 is an application program interface (API) that is exposed to the requesting application 135. Thus, the requesting application 135 may invoke the API of the interface module 130 to tunnel the interrupt request at 310.

The interface module 130 is illustrated in FIG. 3 as simply passing the IRQ at 310 and not necessarily modifying the request. In this way, the interrupt request is passed through the non-secure zone 120 without being handled by additional routines that may alter or otherwise interfere with the interrupt request. Furthermore, because the monitor module 145 resides in the secure zone 125, the interface module 130 causes the processor 105 to switch contexts to the secure zone 125 as part of tunneling the interrupt request.

Switching contexts includes, for example, interrupting execution of the requesting application by causing the processor 105 to pause the execution and saving a current context of the processor from executing the requesting application 135 in the non-secure zone 120. Additionally, as explained previously, the processor 105 saves state information from operating registers of the processor 105 so that after the secure interrupt has complete, the processor 105 has the state information to switch back to executing the requesting application 135. Also, as a precaution, the processor 105 disables additional interrupts from being issued while the present request is being handled.

Thus, in one embodiment, the interface module 130 tunnels the interrupt request by receiving the request from the requesting application 135, identifying that the interrupt request is for a secure interrupt, storing the interrupt request in a shared memory to pass the request between security zones, and initiating a switch (e.g., executing a secure monitor call (SMC)) between the non-secure zone 120 and the secure zone 125. In this way, the interface module 130 tunnels the interrupt request between zones to provide access to the secure assets for the requesting application 135.

At 440, the secure interrupt is issued in response to the interrupt request. In one embodiment, the monitor module 145, upon receiving the interrupt request, translates the interrupt request into a secure interrupt so that the secure interrupt can be issued and serviced. That is, the monitor module 145 determines various attributes of the interrupt request and generates the secure interrupt according to the attributes. In one embodiment, the monitor module 145 parses the interrupt request to determine an ID of the secure interrupt that is being requested. Subsequently, the monitor module 145 uses the ID as input to the lookup table in order to determine and select a trusted application (e.g., trusted application 150) that is registered to service the identified secure interrupt.

In general, trusted applications that are registered in the lookup table are applications/routines that are approved to execute in the secure zone 125 of the processor 105. Each trusted application includes, for example, a secure signature that verifies an identity and integrity of the respective trusted application. Additionally, each trusted application may include additional built-in functions that permit the trusted applications to perform sensitive routines and/or access sensitive resources, i.e., secure assets of the processor 105.

Thus, the monitor module 145, at 440, issues secure interrupt by executing different tasks to identify the trusted application 150 from a plurality of different trusted applications and to generate the secure interrupt.

At 450, the secure interrupt is serviced. In one embodiment, the monitor module 145 services the secure interrupt at 320, 330, and 340 using the trusted application 150 to access a requested secure asset. For example, the monitor module 145 calls the trusted application 150 to execute. The trusted application 150 either accesses a secure resource (e.g., secure memory, I/O port, etc.) or a secure routine (e.g., real-time clock, secure timer, etc.), at 330.

In one embodiment, accessing the secure asset includes retrieving electronic data from the memory 110 that is stored in a memory space that is non-addressable when the processor 105 is operating in the non-secure zone 120. Additionally, accessing the secure asset may include controlling a device attached to one of the I/O bus 115, writing data to the memory 110, retrieving data from a device attached to one of the I/O bus 115, and so on. Furthermore, accessing a secure routine by the trusted application 150 includes, in one embodiment, causing the secure routine to execute, causing the secure routine to change a register value of the processor 105, causing the secure routine to provide data, asynchronously offloading additional tasks for servicing the secure interrupt to other trusted applications at 330, and so on. In general, the noted examples are provided for purposes of explaining how accessing the secure assets occurs. Accessing the secure assets using the trusted application 150 or another registered trusted application are not limited to the examples provided herein.

Once the trusted application is complete, at 330, a result or notification is returned to the monitor module 145, at 340, depending on the task completed at 330. That is, if the trusted application 150 retrieved data, then the data may be provided. Alternatively, if the trusted application 150 caused the processor 105 to execute a secure routine, then a notice may be provided back to the monitor module 145 that the secure routine completed. In either case, the flow 300 returns to the monitor module at 340.

As a final task to service the secure interrupt, the monitor module 145, at 350 in the flow 300, restores the non-secure zone 120. In one embodiment, restoring the non-secure zone 120 as part of completing servicing of the secure interrupt, at 450 of method 400, includes passing data/notifications to the requesting application 135 using a shared memory, rescheduling the requesting application 135 to execute, and restoring state information associated with the non-secure zone 120 to registers of the processor 105.

Figure 5:
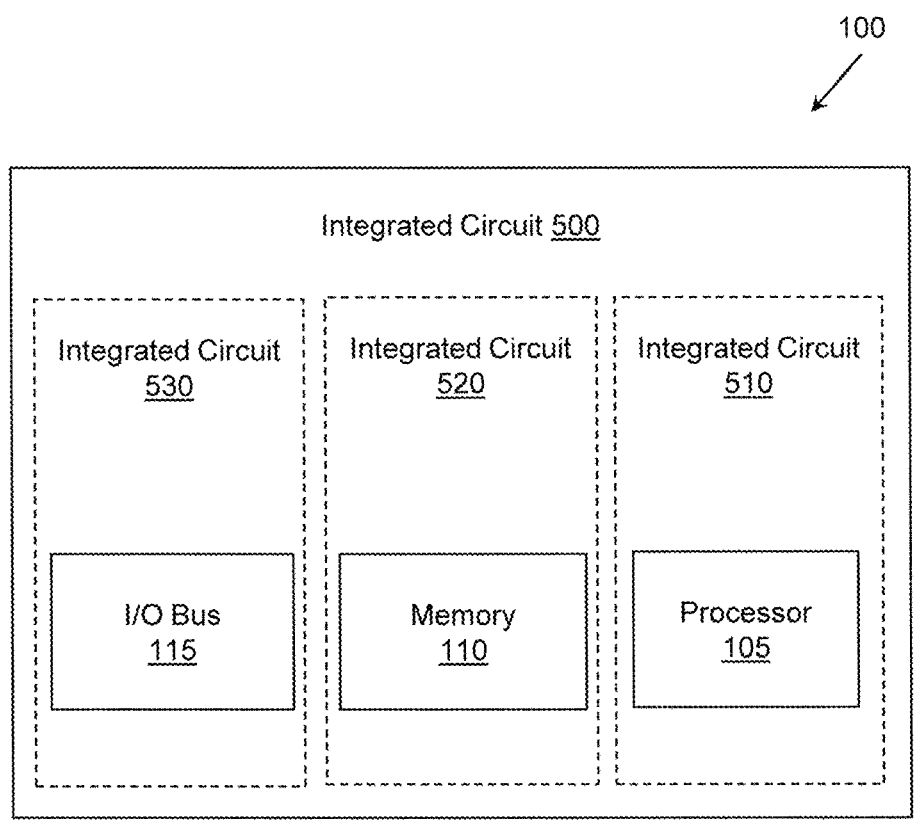
FIG. 5 illustrates one embodiment of an integrated circuit that operates according to methods disclosed herein.

FIG. 5 illustrates an additional embodiment of the apparatus 100 from FIG. 1 that is configured with separate integrated circuits and/or chips. In this embodiment, the processor 105 from FIG. 1 is embodied as a separate integrated circuit 510. Additionally, the memory 110 is embodied on an individual integrated circuit 520. The I/O bus 115 are also embodied on an individual integrated circuit 530. The circuits are connected via connection paths to communicate signals. While integrated circuits 510, 520, and 530 are illustrated as separate integrated circuits, they may be integrated into a common integrated circuit board 500. Additionally, integrated circuits 510, 520, and 530 may be combined into fewer integrated circuits or divided into more integrated circuits than illustrated. In other embodiments, portions of the functionality associated with the I/O bus 115 may be embodied as firmware executable by processor 105 and stored in a non-transitory memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a random access memory RAM, a read-only memory ROM, cache memory, a memory chip or card, a memory stick, and other electronic media that can store computer instructions and/or data. Computer storage media described herein are limited to statutory subject matter under 35 U.S.C § 101.

In one embodiment, one or more of the components described herein are configured as modules stored in a non-transitory computer storage medium. The modules are configured with stored instructions that when executed by at least a processor cause the computing device to perform the corresponding function(s) as described herein. Module as described herein is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

What is claimed is:

1. A non-transitory computer-storage medium including instructions that when executed by a processor cause the processor to:

in response to receiving an interrupt request from a requesting application executing on the processor in a non-secure processing zone comprising a first virtual machine having a first operating system kernel, tunnel the interrupt request into a secure processing zone comprising a second virtual machine having a second operating system kernel, wherein the interrupt request is a request to utilize one or more secure assets that are maintained within the secure processing zone, said tunneling including context switching from the non-secure processing zone to the secure processing zone, said context switching including halting execution of the requesting application and storing an execution state of the processor;

in response to receiving within the secure processing zone the interrupt request from the non-secure processing zone, issuing, within the secure processing zone, a secure interrupt request to a trusted application that is registered to handle the secure interrupt request, wherein the trusted application is configured to execute when the processor is operating in the secure processing zone in response to said context switching, wherein issuing the secure interrupt request includes identifying the trusted application by determining, within the secure processing zone, which trusted application of a plurality of trusted applications that are registered in a lookup table is registered to handle the secure interrupt request, binding the trusted application to the secure interrupt request in response to the trusted application being installed, and wherein the lookup table correlates different secure interrupt requests with trusted applications that are associated with one or more secure assets; and service the secure interrupt request by executing the trusted application within the secure processing zone to interact with one or more of the secure assets to fulfill the interrupt request.

2. The non-transitory computer-storage medium of claim 1, wherein binding the trusted application includes: generating an entry in the lookup table that identifies the trusted application as an interrupt service routine for handling the secure interrupt request.

3. The non-transitory computer-storage medium of claim 2, wherein binding the trusted application to the secure interrupt request includes:
  receiving a request from the trusted application,
  parsing the request to identify information associated with the trusted application,
  determining an associated secure interrupt request based upon the information, and
  creating the entry in the lookup table to indicate that the associated secure interrupt request is correlated with the trusted application.

4. The non-transitory computer-storage medium of claim 1, wherein the secure assets are secure resources associated with the processor and secure routines associated with the processor that execute in the secure processing zone, and wherein the secure processing zone and the non-secure processing zone include separate security controls that restrict access to memory address space reserved for the secure processing zone by applications executing in the non-secure processing zone.

5. The non-transitory computer-storage medium of claim 1, wherein the instructions, when executed by the processor, further cause the processor to invoke an application program interface that bypasses an operating system kernel of the non-secure processing zone and to provide the interrupt request directly to the secure zone of the processor to protect the secure interrupt request from being accessed in the non-secure processing zone.

6. The non-transitory computer-storage medium of claim 1, wherein said context switching includes:
  loading a stored execution state of the processor for the secure processing zone; and
  disabling additional interrupts from being issued while the secure interrupt request is being serviced.

7. The non-transitory computer-storage medium of claim 1, wherein servicing the secure interrupt request includes:
  passing data to the requesting application from one of the secure assets using a shared memory associated with the processor,
  rescheduling the requesting application that was executing when the interrupt request was received, and
  restoring state information associated with the non-secure processing zone to registers of the processor to restore the processor to executing in the non-secure processing zone.

8. A method comprising:
  receiving an interrupt request within a non-secure processing zone comprising a first virtual machine having a first operating system kernel from a requesting application executing on a processor in the non-secure processing zone comprising a second virtual machine having a second operating system kernel;
  in response to the interrupt request, tunneling the interrupt request into a secure processing zone, wherein the interrupt request is a request to utilize one or more secure assets that are maintained within the secure processing zone, said tunneling including context switching from the non-secure processing zone to the secure processing zone, said context switching including halting execution of the requesting application and storing an execution state of the processor;
  in response to receiving within the secure processing zone the interrupt request from the non-secure processing zone, issuing, within the secure processing zone, a secure interrupt request to a trusted application that is registered to handle the secure interrupt, wherein the trusted application executes when the processor is operating in the secure processing zone in response to said context switching, wherein issuing the secure interrupt request includes identifying the trusted application by determining, within the secure processing zone, which trusted application of a plurality of trusted applications that are registered in a lookup table is registered to handle the secure interrupt request, binding the trusted application to the secure interrupt request in response to the trusted application being installed, and wherein the lookup table correlates different secure interrupt requests with trusted applications that are associated with one or more secure assets; and
  servicing the secure interrupt request by executing the trusted application within the secure processing zone to interact with one or more of the secure assets to fulfill the interrupt request.

9. The method of claim 8, further comprising: wherein binding the trusted application includes generating an entry in the lookup table that identifies the trusted application as an interrupt service routine for handling the secure interrupt request.

10. The method of claim 9, wherein binding the trusted application to the secure interrupt request includes:
  receiving a request from the trusted application,
  parsing the request to identify information associated with the trusted application,
  determining an associated secure interrupt request based upon the information, and
  creating the entry in the lookup table to indicate that the associated secure interrupt request is correlated with the trusted application.

11. The method of claim 8, wherein the secure assets are secure resources associated with the processor and secure routines associated with the processor that execute in the secure processing zone, and wherein the secure zone and the non-secure zone include separate security controls that cause the processor to restrict access to memory address space reserved for the secure processing zone by applications executing in the non-secure processing zone.

12. The method of claim 8, wherein the secure interrupt request causes the processor to access one or more of the secure assets that are isolated in the secure processing zone separate from the non-secure zone in which the requesting application is executing,
  wherein tunneling the interrupt request invokes an application program interface that bypasses an operating system kernel of the non-secure processing zone and provides the interrupt request directly to a monitor module in the secure processing zone, and
  wherein the non-secure processing zone prevents the processor from accessing one or more resources that are accessible through the secure processing zone.

13. The method of claim 8, wherein said context switching includes:
  loading a stored execution state of the processor for the secure processing zone; and
  disabling additional interrupts from being issued while the trusted application processes the secure interrupt request.

14. The method of claim 8, wherein servicing the secure interrupt request includes:
  issuing, by the trusted application, a notice that the trusted application has completed execution,
  passing data to the requesting application using a shared memory, rescheduling, by the processor, the requesting application that was executing when the interrupt request was received, and restoring state information associated with the non-secure zone to registers of the processor.

15. An apparatus, comprising:

a memory; and a processor for executing instructions loaded in the memory, wherein the instructions, when executed by the processor, cause the processor to:

in response to receiving an interrupt request from a requesting application that executes on the processor in a non-secure processing zone comprising a first virtual machine having a first operating system kernel, tunnel the interrupt request into a secure processing zone comprising a second virtual machine having a second operating system kernel, wherein the interrupt request is a request to utilize one or more secure assets that are maintained within the secure processing zone, said tunneling including context switching from the non-secure processing zone to the secure processing zone, said context switching including halting execution of the requesting application and storing an execution state of the processor;

in response to receiving within the secure processing zone the interrupt request from the non-secure processing zone, issuing, within the secure processing zone, a secure interrupt request to a trusted application that is registered to handle the secure interrupt request, wherein the trusted application executes when the processor is operating in the secure processing zone in response to said context switching, wherein issuing the secure interrupt request includes identifying the trusted application by determining, within the secure processing zone, which trusted application of a plurality of trusted applications that are registered in a lookup table is registered to handle the secure interrupt request, binding the trusted application to the secure interrupt request in response to the trusted application being installed, and wherein the lookup table correlates different secure interrupt requests with trusted applications that are associated with one or more secure assets; and service the secure interrupt request by causing the trusted application to execute within the secure processing zone to interact with one or more of the secure assets to fulfill the interrupt request.

16. The apparatus of claim 15, wherein said context switching includes:

loading a stored execution state of the processor for the secure processing zone; and disabling additional interrupts from being issued while the secure interrupt request is being serviced.

17. The apparatus of claim 15, further comprising:

an input/output bus configured to connect the apparatus with one or more devices, wherein the input/output bus is one of the secure assets, wherein the interrupt request is a request to access the input/output bus, and wherein the trusted application accesses the input/output bus on behalf of the requesting application by executing in the secure processing zone.

18. The apparatus of claim 15, wherein binding the trusted application includes: generating an entry in the lookup table that identifies the trusted application as an interrupt service routine for handling the secure interrupt request.

19. The apparatus of claim 18, wherein binding the trusted application to the secure interrupt request includes:

receiving a request from the trusted application, parsing the request to identify information associated with the trusted application, determining an associated secure interrupt request based upon the information, and creating the entry in the lookup table to indicate that the associated secure interrupt request is correlated to the trusted application.

20. The apparatus of claim 15, wherein the secure assets are secure resources associated with the processor and secure routines associated with the processor that are accessible by the processor only in the secure processing zone, and wherein the secure zone and the non-secure zone include separate security controls that restrict access to address space of the memory reserved for the secure processing zone by applications executing in the non-secure processing zone.

* * * * *